United States Patent [19]

Hooper

[11] Patent Number: 4,954,324

[45] Date of Patent: Sep. 4, 1990

[54] METHOD OF BAGHOUSE BROWN PLUME POLLUTION CONTROL

[75] Inventor: Richard G. Hooper, Littleton, Colo.

[73] Assignee: NaTec Resources, Inc., Houston, Tex.

[21] Appl. No.: 321,308

[22] Filed: Mar. 10, 1989

Related U.S. Application Data

[62] Division of Ser. No. 174,654, Mar. 29, 1988, Pat. No. 4,908,194.

[51] Int. Cl.$^5$ .......................... B01J 8/00; C01B 21/00; C01B 17/00
[52] U.S. Cl. ..................................... 423/239; 423/244
[58] Field of Search ............... 423/244 A, 239, 239 A, 423/235, 235 D, 244 R

[56] References Cited

U.S. PATENT DOCUMENTS 4,154,803  5/1979  Uchikawa et al. ................. 423/239
4,839,147  6/1989  Lindbauer et al. ................. 423/239

Primary Examiner—Gregory A. Heller
Attorney, Agent, or Firm—The Dulin Law Firm

[57] ABSTRACT

Baghouse $SO_x/NO_x$ pollution control process comprising injecting from 1 to 25% urea or ammonia along with dry, finely divided sodium bicarbonate or Nahcolite, a naturally occurring form of sodium bicarbonate. The process removes both $SO_x$ and $NO_x$ from the flue gases of utility and industrial plants, incinerators and the like by dry injection into a flue gas duct a sufficient distance upstream of a baghouse to collect spent reagent and additive. The sodium reagent reacts with the $SO_2$ to form sodium sulfate and also removes $NO_x$ in the form of NO. The urea or ammonia additive prevents the conversion of NO to $NO_2$ by the sodium reagent, and reduces the concentration of the $NO_2$ in the exit flue gases to below the $NO_2$ brown plume visibility threshold (about 30 ppm $NO_2$, not corrected to 0% $O_2$, depending on ambient conditions). The additive may be used wet (sprayed into the flue gases in a concentrated water solution) or dry.

16 Claims, 3 Drawing Sheets

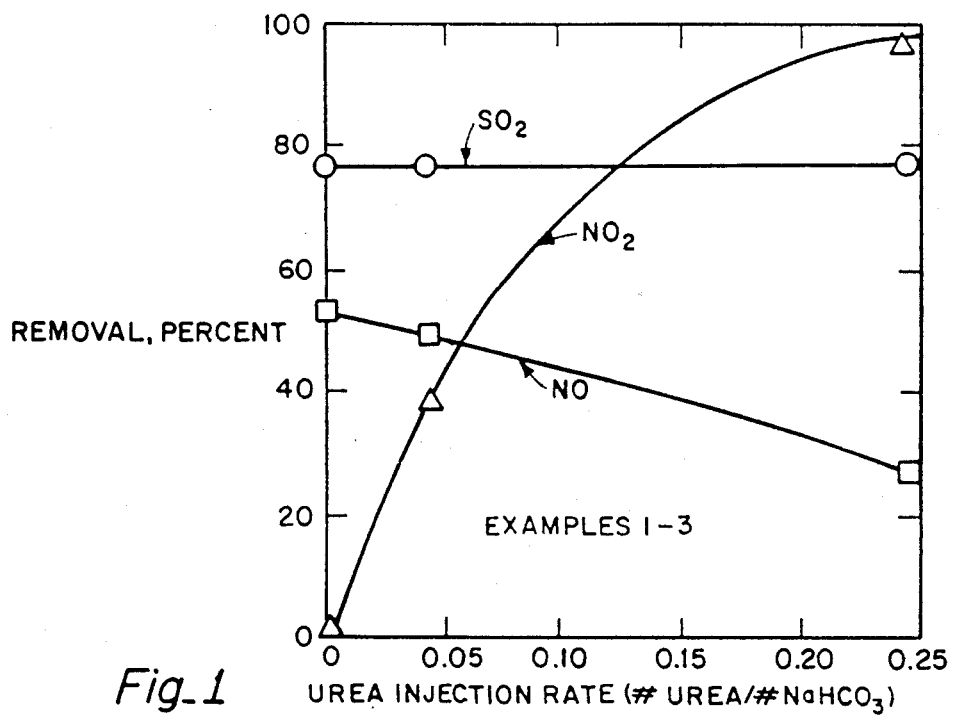
Fig_1
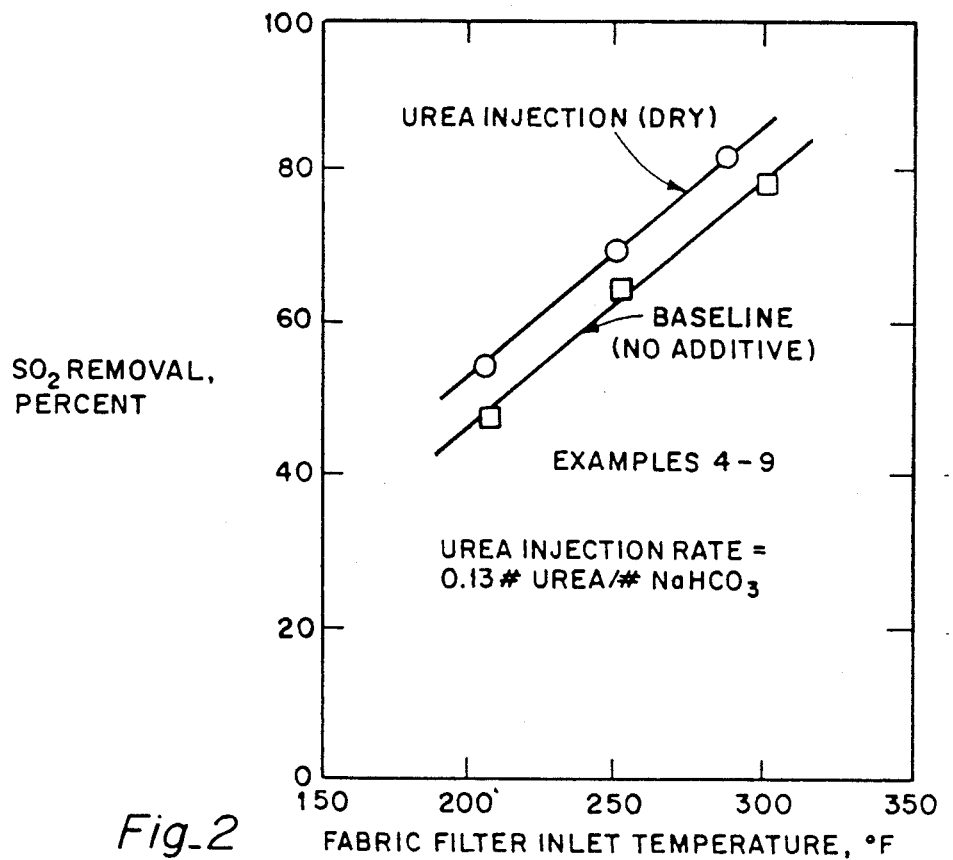
Fig_2

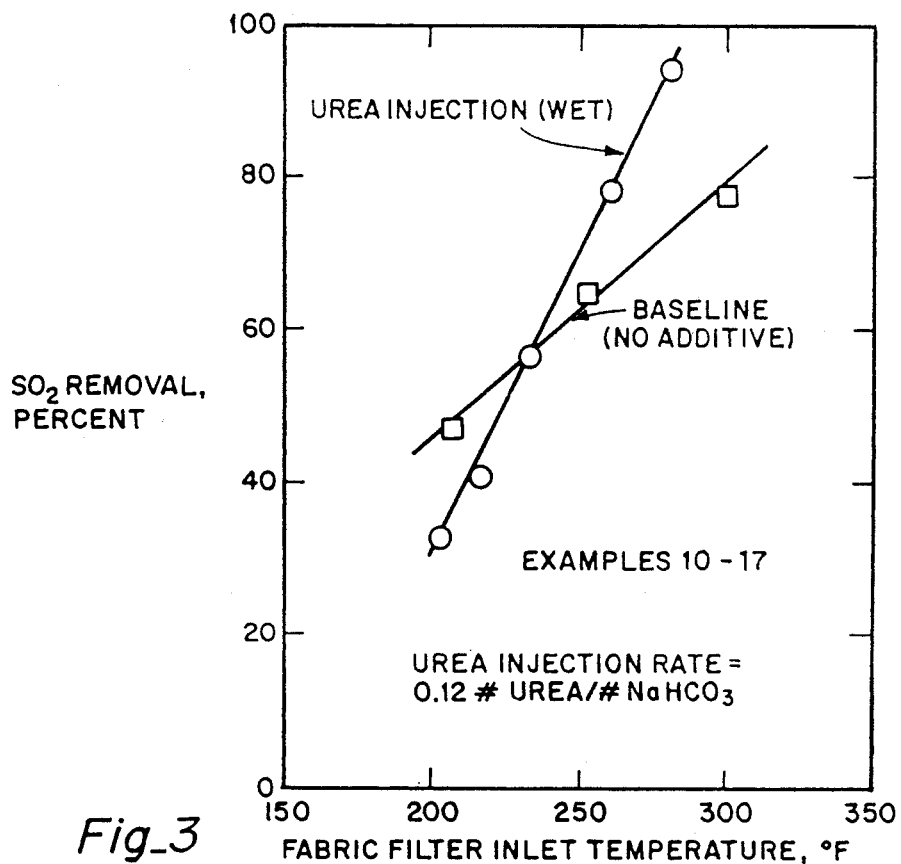
Fig_3
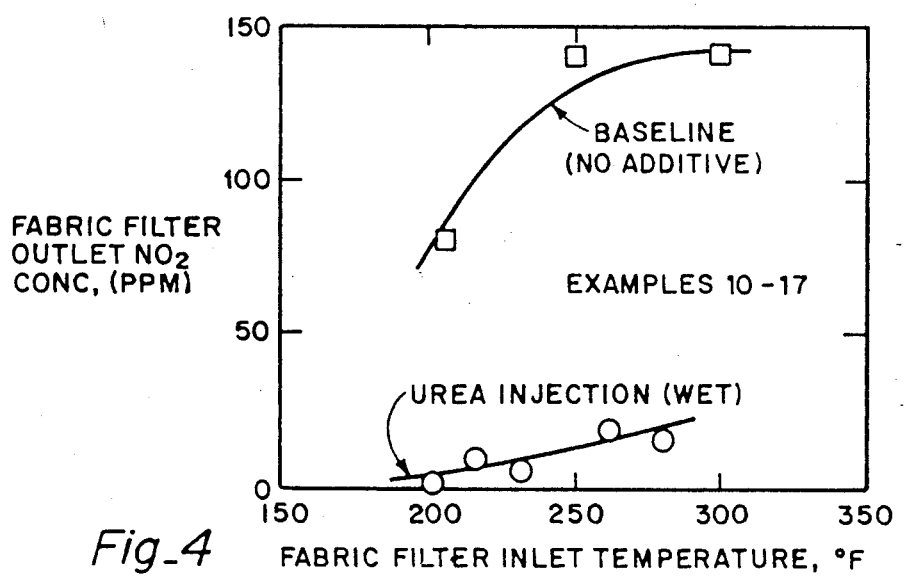
Fig_4

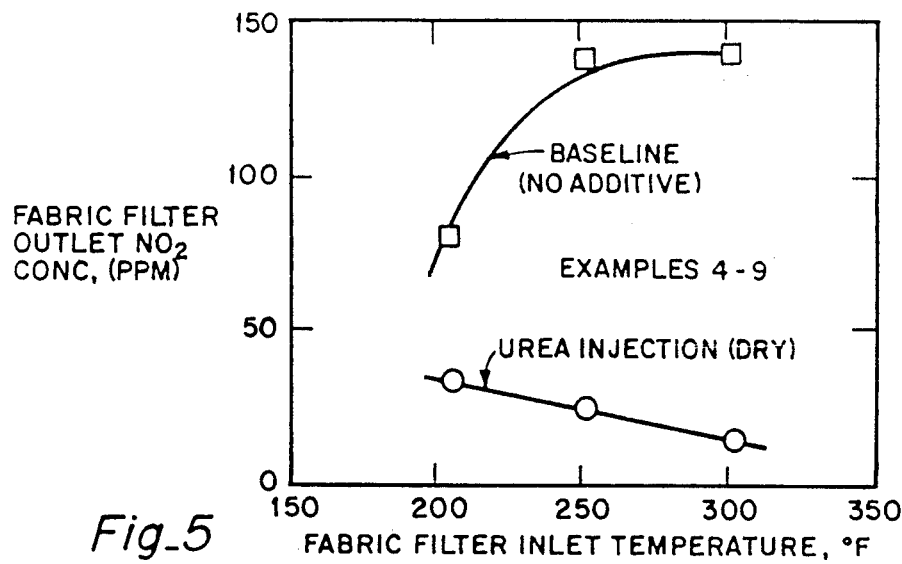
Fig_5
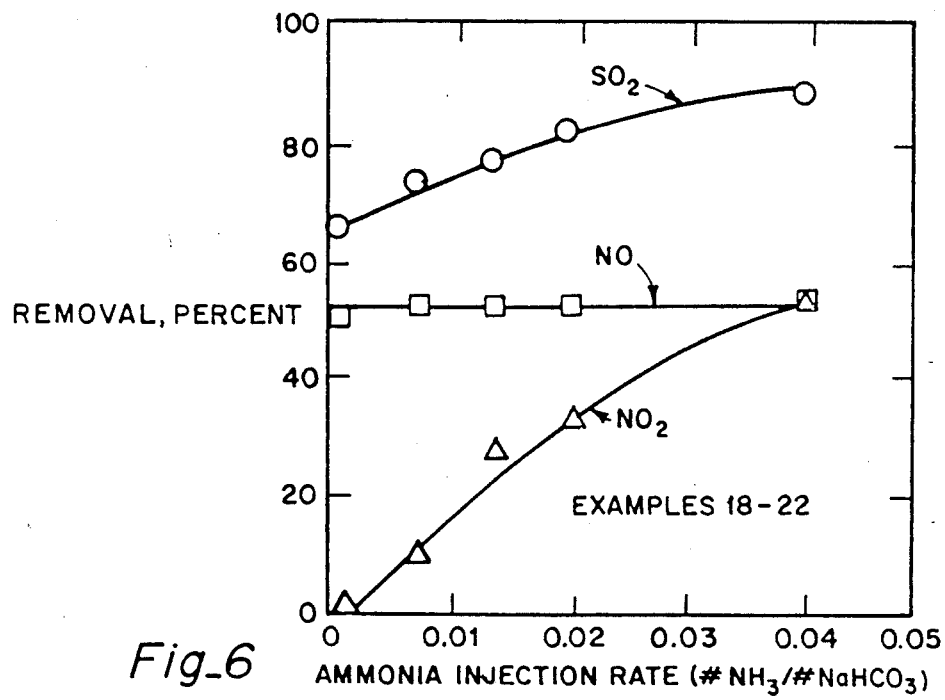
Fig_6

METHOD OF BAGHOUSE BROWN PLUME POLLUTION CONTROL

This is a divisional, of application Ser. No. 174,654 filed Mar. 29, 1988 by Richard G. Hooper, now U.S. Pat. No. 4,908,194.

FIELD

The invention relates broadly to a method for baghouse $SO_x/NO_x$ pollution control, and more specifically to a method for control of brown plume coloration associated with the injection of sodium reagents into the flue gas duct work ahead of a baghouse to remove $SO_2$ from industrial and utility plants that fire (burn) fossil fuels or wastes to generate electricity, steam or heat. More particularly, the method of the invention employs sodium bicarbonate (preferably nahcolite) plus urea or ammonia to suppress the formation of $NO_2$ which causes plume coloration in exit flue gases.

BACKGROUND

The increasing use of sulfur-containing fuels as energy sources, namely coal and oil, has resulted in pollution of the atmosphere throughout the world. The burning of the fuel produces flue gases containing substantial quantities of $SO_x$, predominantly $SO_2$ and $SO_3$.

A wide variety of processes have been proposed for the removal of the $SO_2$ from flue gases before they are emitted to the atmosphere. Processes using dry solids, liquids or slurries of sorbents injected in a manner to directly contact the flue gases have proven to be effective for control of $SO_2$ emissions. Of these, the calcium-based wet scrubber systems have experienced the greatest use in industrial and utility application. This involves finely grinding lime or limestone of suitable composition, forming a water slurry or mixture, and providing apparatus and method for slurry contact with the flue gases. The $SO_2$ reacts with the calcium reagent to form calcium sulfate/sulfite which is collected and removed in the form of a generally thixotropic sludge. This sludge is usually difficult to dispose because it does not easily dewater, and heavy metals can leach from the waste sludge containment ponds.

Further, abrasion to the slurry pumps and other scrubber handling equipment (due to the hardness of the limestone particles) increases maintenance costs. The operating costs are increased because the evaporation of water in the system cools the flue gases nominally by 200° F. The moist flue gases, containing as they do some residual dissolved $SO_x$, are also acidic. In addition, where the utility or industrial plant is located in an arid region, the water requirements of a wet pollution control process are expensive and drain an already scarce natural resource.

The subject of flue gas desulfurization by the injection of dry sodium-based reagents has been extensively investigated in laboratory, pilot, and full scale applications since the 1960's. These investigations have provided the technical basis to evaluate the economic aspects of the technology and compare its advantage to the current calcium-based technologies. The injection of dry reagents clearly is the least demanding of capital funds for both new and retrofit applications. The use of familiar hardware such as pulverizers, blowers, and silos permit the easy installation and operation of this simple technology.

Accordingly, the injection of dry reagents into flue gases have become of increasing interest. Principal among these is the use of sodium compounds as a reagent or sorbent. Sodium-based reagents that have been used are commercial sodium bicarbonate ($NaHCO_3$), light and dense soda ash ($Na_2CO_3$), sodium sesquicarbonate ($Na_2CO_3.NaHCO_3.2H_2O$), trona (a naturally occurring form of sodium sesquicarbonate), and Nahcolite (a naturally occurring form of sodium bicarbonate). The reagents of greatest effectiveness are commercial sodium bicarbonate and Nahcolite. The sodium bicarbonate or Nahcolite is injected into the flue gas duct of a utility or industrial plant, and reacts with $SO_2$ in the gas stream to produce $Na_2SO_4$ which is collected in a baghouse or on plates of an ESP.

However, I have observed that the use of sodium can result in production of a reddish-brown plume coloration in stack gases downstream of the particulate control device. The use of the sodium bicarbonate not only removes $SO_2$, but also removes some $NO_x$ (NO and $NO_2$). While the precise mechanism is not known at this time, it is presently thought that some step within the overall sulfation reaction (reaction of sodium reagent with $SO_x$) initiates the oxidation of NO to $NO_2$. It is the presence of the $NO_2$ in the exiting flue gases which is the source of the plume coloration.

Accordingly, this promising sodium reagent $SO_x$ control process has a serious disadvantage, in that its use creates an $NO_2$ plume in the process of its removal of $SO_x$ pollution from flue gases. Accordingly, there is a great need for a method by which the $NO_2$ produced by the use of sodium reagents can also be removed or suppressed, while not sacrificing $SO_x$ removal. This invention permits the injection of dry sodium reagents ahead of a baghouse without production of the plume.

THE INVENTION

1. OBJECTS:

It is among the objects of this invention to provide a method for removal or suppression of $NO_2$ formation during the injection of dry sodium reagents ahead of a baghouse, particularly injection of sodium carbonate/bicarbonate compounds into flue gases of utility and industrial plants ahead of a baghouse for removal of $SO_x$.

It is another object of this invention to provide a method for use of urea and/or ammonia in conjunction with dry sodium reagents in a baghouse process for suppression of formation of $NO_2$ while simultaneously removing $SO_x$.

It is another object of this invention to provide a method of $NO_2$ removal or suppression by introduction of urea or ammonia in combination with a sodium bicarbonate reagent into the flue gas of such plants ahead of a baghouse.

It is another object of this invention to improve the $SO_x$ removal efficiency of sodium-based reagents in a baghouse pollution control process, particularly sodium bicarbonate/ Nahcolite, while at the same time removing $NO_x$ and suppressing $NO_2$ emissions to the atmosphere. Still other objects of this invention will be evident from the Summary, Drawings, Detailed Description, Abstract and Claims of this case.

2. SUMMARY:

The method of this invention comprises the introduction of sodium bicarbonate, preferably commercial sodium bicarbonate or Nahcolite (either or both herein termed "bicarb"), in a finely divided dry form, into the flue gas of a utility or industrial plant ahead of a baghouse in the range of from about .1 to 1.5 the Normalized Stoichiometric Ratio of the $SO_x$ to be removed, along with the separate but simultaneous injection of an additive selected from urea and/or ammonia in the range of from about 1 to 25% by weight urea to the weight of the bicarb. The amount of urea injected is preferably about 5 to 15%, while the ammonia is from 1–5%. The additive may be introduced in either dry or liquid form, e.g., a crystalline powder or concentrated solution in water, and both the additive and reagent are injected evenly throughout the gas stream ahead of the baghouse. The reaction products collected by the baghouse can be disposed in the same manner as sodium reagents used without the use of urea or ammonia additive.

While I do not wish to be bound by theory, I presently believe the reaction of the oxides of sulfur ($SO_2$, $SO_3$) in the flue gas occurs with sodium carbonate ($Na_2CO_3$), the product of the thermal decomposition of Nahcolite or sodium bicarbonate ($NaHCO_3$). Therefore, when sodium bicarbonate/Nahcolite (herein bicarb) is injected, the first step necessary for $SO_2$ removal is the decomposition into sodium carbonate:

$$2NaHCO_3 \rightarrow Na_2CO_3 + H_2O + CO_2 \qquad (1)$$

The rate of the decomposition of the bicarb controls the distance downstream of the injection location where the $SO_2$ reaction begins, and, generally speaking, the temperature of the particular flue gas at the injection location determines the rate of decomposition. Other factors influencing decomposition rate include coal type, fly ash composition, and $CO_2$, NO and humidity in the flue gas.

Once the decomposition has proceeded sufficiently to provide sites of sodium carbonate, the $SO_2$ then rapidly reacts according to the following overall reaction:

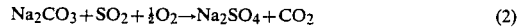

$$Na_2CO_3 + SO_2 + \tfrac{1}{2}O_2 \rightarrow Na_2SO_4 + CO_2 \qquad (2)$$

In the process, there is some conversion of nitrogen oxide (NO) to nitrogen dioxide ($NO_2$). Some, but not all of the $NO_2$ reacts with the carbonates and/or sulfates produced by the injection of the reagent. The remaining unreacted $NO_2$ exits the baghouse and is responsible for producing a reddish-brown plume coloration. This plume coloration problem arose when $NO_2$ exceeds about 30 ppm (not corrected to 0% $O_2$) under the baghouse conditions of this pilot test. Surprisingly, the use of urea or ammonia along with the bicarb reagent reduces or eliminates the unreacted $NO_2$ from the exit gas stream and thereby prevents the unwanted plume coloration.

The two additives were tested in two ways: First, in a bench scale 0.2 ACFM fluidized bed of commercial sodium bicarbonate (Church & Dwight 3DF), where a simulated flue gas is used to fluidize an inch deep bed of the sodium bicarbonate. These tests were used as a pre-screening to determine if larger scale testing was warranted. The results showed that both additives merited further test work. Since the fluid bed test work was small scale for pre-screening, those tests are not reported here. Only the more significant, best mode pilot baghouse scale tests are reported herein.

Second, a pilot scale baghouse test series used a 2200 ACFM slip stream of gases from a coal-fired power plant, with the exhaust gases downstream of the pilot-sized baghouse being returned to the main gas stream ahead of the regular plant baghouse. The flue gases slip stream was withdrawn in the range of 260–275° F., and heated to test conditions, typically 300° F. Urea was tested in the range of 205° F. (wet injection) to 330° F. (dry injected). Typical stack $O_2$ was around 6%.

Fluid bed testing of ammonia, however, was not as encouraging as that for urea. Extremely high levels of ammonia ($\sim$5:1) were necessary in the fluid bed reactor to obtain significant $NO_2$ removal. However, ammonia proved to be much more effective in reducing $NO_2$ concentrations in the pilot plant baghouse system than it did in the bench reactor. Although the $NO_2$ reduction mechanism with $NH_3$ is significantly different than with urea, the two compounds appear about equally effective in reducing $NO_2$ on a moles of nitrogen injected basis.

When urea is heated above its melting point (271° F.), it decomposes into ammonia and isocyanic acid by the equilibrium:

$$(NH_2)_2CO \rightarrow NH_3 + NHCO \qquad (3)$$

These compounds may then polymerize into a mixture of cyanuric acid, triuret, and ammonia by the following equilibrium:

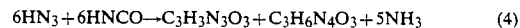

$$6HN_3 + 6HNCO \rightarrow C_3H_3N_3O_3 + C_3H_6N_4O_3 + 5NH_3 \qquad (4)$$

Because of the variety of forms which may be encountered when urea decomposes under variable conditions, it is currently unknown just what compound was active during this testing.

During the preliminary fluid bed tests of the urea additive, it appeared to be effective at temperatures fifty degrees lower than the referenced melting temperature. Further, the urea additive appeared to aid in low temperature decomposition of the sodium bicarbonate sorbent. The mass mean diameter of the sodium bicarbonate was about 100 um (micrometers).

DRAWINGS

The invention is further illustrated in connection with the drawings in which:

FIG. 1 is a graph showing the effects of urea addition when injecting sodium bicarbonate for flue gas desulfurization in terms of removal percent of $SO_2$, NO and $NO_2$ vs. urea injection rate (lbs. urea/lb. $NaHCO_3$) at 300° F.

FIG. 2 is a graph showing the effects of dry urea addition and temperature on $SO_2$ removal when injecting sodium bicarbonate for flue gas desulfurization in terms of $SO_2$ removal percent vs. fabric filter (baghouse) inlet temperature, at 13% dry urea injection rate.

FIG. 3 is a graph showing the effects of wet urea addition and temperature on $SO_2$ removal when injecting sodium bicarbonate for flue gas desulfurization in terms of $SO_2$ removal percent vs. fabric filter (baghouse) inlet temperature, at 12% wet urea injection rate.

FIG. 4 is a graph showing the effects of wet urea addition and temperature on outlet $NO_2$ concentration when injecting sodium bicarbonate for flue gas desulfurization in terms of fabric filter (baghouse) outlet concentration (in ppm) vs. fabric filter (baghouse) outlet temperature in °F. for wet urea injection.

FIG. 5 is a graph showing the effects of dry urea addition and temperature on outlet $NO_2$ concentration when injecting sodium bicarbonate for flue gas desulfurization in terms of fabric filter (baghouse) outlet $NO_2$ concentration (in ppm) vs. fabric filter (baghouse) inlet temperature in °F. for dry urea injection.

FIG. 6 is a graph showing the effects of from 1-5% ammonia addition when injecting sodium bicarbonate for flue gas desulfurization in terms of removal percent of $SO_2$, NO and $NO_2$ vs. ammonia injection rate in the range of 1-5% (lbs. $NH_3$ per lb. $NaHCO_3$).

DETAILED DESCRIPTION OF THE BEST MODE—EXAMPLES 1-22

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

While the terms sodium bicarbonate and Nahcolite are used interchangeably throughout in case of generic descriptive context, the tested reagent (or sorbent) was commercial sodium bicarbonate. The term "reagent" means the sodium reagent alone, while "additive" means ammonia or urea. The test results are shown as the data points on the graphs of FIGS. 1-6 as the simplest, most direct way of recording the data and illustrating the relationship observed.

TEST SET-UP

The fluid bed test set-up was a 0.2 ACFM stream of simulated flue gases passing through a 1" high heated bed of sodium bicarbonate in a reactor chamber comprising a sintered glass plate spanning a vertical 1" diameter glass tube. The gases were heated to the test temperature by external heaters and fed upwardly through the plate to fluidize the bed. The dry additive was injected by a small feeder into the bed when fluidized. The wet additive solution was sprayed into the reactor at the same level. A static filter was used downstream to catch blow-by from the bed. The simulated flue gases contained: 12% $CO_2$; 6% $O_2$; 900 ppm $SO_2$; 0% $NO_2$; balance $N_2$; and the NO varied from test to test in the range of 400-900 ppm.

The pilot test series baghouse set-up comprised of tapping off a 2200 ACFM slip stream of flue gases from a coal-fired power plant burning a typical western sub-bituminous coal ranging from about 10,500 BTU/lb to 12,800 BTU/lb, 8% ash, and 0.3-0.5%S. The 12" duct was insulated and heated to maintain the flue gas at the desired test temperature in the main duct. A small feeder placed some 10' upstream of a pilot baghouse (24 bags, each 9" diameter by 12' long, vertically hung, bottom entry) was used to introduce the dry sodium bicarbonate reagent. This provided about 0.1 sec gas stream residence time for the reagent and additive. Additional time for reaction is provided by the residence time of the reagent and additive collected on the bag cake. For the additive injection, a second small feeder (for dry additive), or spray nozzle (for wet additive) was positioned in the same location. The cleaned flue gases exiting the pilot bag were reintroduced into the main gas stream. Plume formation or reduction was not directly observed. Rather, it was inferred from $NO_2$ concentration measurements on the outlet side of the pilot baghouse.

Inlet temperatures and $SO_2$, NO and $NO_2$ concentrations were taken ahead of the reagent and additive injection point, and outlet just downstream of the filter media.

Sulfur dioxide ($SO_2$), nitrogen oxide (NO), total oxides of nitrogen ($NO_x$), Oxygen ($O_2$), carbon dioxide ($CO_2$), and nitrogen dioxide ($NO_2$) were continuously sampled, monitored and recorded on analog strip charts. Calibration was conducted several times daily with standard bottled calibration gases. $SO_2$, NO or $NO_x$, and $O_2$ were measured for selected periods at one location and then switched to the other location for selected periods.

The continuous monitoring system used the analytical instruments as described below:

| Flue Gas Component | Measurement Method |
|---|---|
| Sulfur Dioxide | Ultraviolet, photometric |
| Nitrogen Dioxide | |
| Nitrogen Oxides | Chemiluminescence |
| Oxygen | Electrochemical |
| Carbon Dioxide | NDIR*, photometric |

*NDIR means Non-Destructive Infrared

Using these monitors, samples of flue gas were withdrawn through stainless steel, sintered filters and heated sample lines and analyzed for concentrations of $SO_2$, NO, $NO_x$, $NO_2$, $CO_2$, and $O_2$.

PILOT BAGHOUSE TEST RESULTS

FIG. 1 presents $SO_2$, NO and $NO_2$ removals for Examples 1-3, a comparative test series for dry injection of urea. Example 1 is the base line case of no urea additive (data points on the left of each line on the graph). Example 2 shows 5% urea addition (central three data points), and Example 3 shows 25% urea addition (data points at the right end of each line on the graph). Nominal conditions during testing were the following:

Fabric filter inlet temperature=300° F.
Fabric filter inlet $SO_2$/NO ratio=1.25
Fabric filter inlet $SO_2$ concentration=900 ppm
$NaHCO_3$ to $SO_2$ NSR*=1.0
* Normalized Stoichiometric Ratio Inspection of FIG. 1 reveals no effect of urea injection on $SO_2$ removal but a significant effect on NO and $NO_2$ emissions. The rapid increase in $NO_2$ removal with injection rate is accompanied by a drop in NO removal. Urea apparently works to reduce $NO_2$ emissions by interfering with the NO and $NO_2$ oxidation step discussed previously. The result is a drop in NO removal and associated $NO_2$ emissions.

FIG. 2 shows data points for Examples 4-9 (each point being a test example), which are graphed as $SO_2$ removal as a function of fabric filter inlet temperature. The data was obtained with a constant dry urea injection rate of 0.13 lbs. of urea per pound of sodium bicarbonate injected. A definite improvement in $SO_2$ removal over baseline conditions is observed, especially at lower temperatures.

For Examples 10-17 FIG. 3 presents pilot baghouse test data, similar to that shown in FIG. 2, except the urea additive is injected as a solution at a 12% rate. Lower $SO_2$ removals (below baseline) seen in the figure at lower temperatures appear to be the result of poor atomization and evaporation of the urea solution. Increased $SO_2$ removals at higher temperatures may be the result of improved evaporation and dispersion of the additive droplets.

FIGS. 4 and 5 present $NO_2$ pilot baghouse test data from Examples 10-17 (FIG. 4) and Examples 4-9 (FIG.

5) for fabric filter outlet $NO_2$ emissions as a function of inlet temperature and form (wet or dry) of additive injection. The data indicate better $NO_2$ removals at low temperatures by the concentrated urea solution as compared to dry injection of the additive. The cause of this result could once again be related to some artifact of the injection/evaporation process, or simply be due to data scatter.

AMMONIA ADDITIVE RESULTS

A series of tests (Examples 18-22) to evaluate injection of a concentrated aqueous solution of pure anhydrous ammonia as an $NO_2$ mitigation additive were conducted at essentially the same conditions as for the pilot scale baghouse tests of urea. Data from this series is presented in FIG. 6. As seen from inspection of the figure, significant $NO_2$ capture is possible with ammonia.

A significant increase in $SOhd 2$ removal was also observed whenever ammonia was injected into the gas stream. A gas phase reaction between ammonia and sulfur dioxide at the temperatures tested was somewhat surprising, giving rise to questions concerning potential problems with the sampling system. $SO_2$ removal data was, however, obtained using two separate continuous monitoring systems. One monitor operating dry employed an upstream condenser sample-conditioning system. Another monitor, however, analyzed a hot, wet gas sample at a temperature consistent with that encountered in the flue gas stream.

It appears that the $SO_2$ removal with ammonia may be by some process other than a gas phase reaction. Other research at Arapahoe reported in *Selective Catalytic Reduction for Coal-Fired Power Plants—Pilot Plant Results.* Palo Alto, Calif.; Electric Power Research Institute, April 1986. CS-4386, has indicated reaction of $SO_x$ and ammonia in the gas stream with aluminum in the fly ash. This may result in formation of an ammonium/aluminum/sulfate compound with the net effect of increasing $SO_2$ removal.

DISCUSSION

Urea and ammonia both appear to be useful additives for $NO_2$ control where sodium bicarbonate injection in a baghouse system is used for $SO_2$ reduction. The advantage of urea is to prevent $NO_2$ formation while increasing $NaHCO_3$ reactivity down to 210° F. $NO_2$ formation is sensitive to BET surface area of bicarb; i.e., the greater the BET the greater $NO_2$ formation.

As an alternative to sequential or simultaneous urea or ammonia injection up or downstream of the reagent injection point, the following process steps may be employed:

a. injection of bicarb at 550° F.-700° F. in the duct just before the air preheater, or take a slip stream and inject the bicarb. At this temperature, no $NO_2$ is formed;

b. then inject $NH_3$ downstream of the air preheater. This will reduce 50% of the usual $NO_2$ formation while some $NH_3$ will react with $SO_2$; and c. then inject urea, $H_2NCONH_2$. This has a higher $NO_2$ reduction capability than $NH_3$, so it can eliminate $NO_2$ formation and increase $SO_2$ removal by bicarb at lower temperatures.

It should be understood that various modifications within the scope of this invention can be made by one of ordinary skill in the art without departing from the spirit thereof. I therefore with my invention to be defined by the scope of the appended claims as broadly as the prior art will permit, and in view of the specification if need be.

What is claimed is:

1. An $SO_x/NO_x$ air pollution control process employing a baghouse to simultaneously control particulate emissions comprising the steps of:
   (a) introducing a sodium-based sorbent into a stream of flue gas from an industrial or utility plant burning fossil fuels or waste to generate electricity, steam or heat, said flue gas containing $SO_x$ and $NO_x$ and having a temperature above about 200° F. and below about 700° F.;
   (b) introducing as additives, urea and ammonia into said flue gases in an amount ranging from about 1 to about 25% by weight of said sodium-based sorbent;
   (c) maintaining said sorbent and said additives in contact with said flue gas for a time sufficient to react said sorbent with some of said $SO_x$ and $NO_x$ thereby reducing the concentration of said $SO_x$ and $NO_x$ in said flue gas;
   (d) said additives, as compared to use of said sorbent without said additives, increasing the percent $SO_x$ removal and the percent $NO_x$ removal by said sorbent while suppressing conversion of NO to $NO_2$ by said sorbent to below about the visible brown plume threshold; and
   (e) collecting said reacted sorbent and additive in a baghouse.

2. An $SO_x/NO_x$ air pollution control process as in claim 1 wherein said sodium-based sorbent is selected from the group consisting essentially of sodium bicarbonate, Nahcolite, soda ash, trona, carbonated trona, sodium sesquicarbonate, and combinations thereof.

3. An $SO_x/NO_x$ air pollution control process as in claim 2 wherein said sorbent is selected from the group consisting essentially of dry Nahcolite and sodium bicarbonate.

4. An $SO_x/NO_x$ air pollution control process as in claim 3 wherein said urea is used in an amount of from about 5% to 25% of said sorbent, and said ammonia is used in an amount of from about 1 to 5% of said sorbent.

5. An $SO_x/NO_x$ air pollution control process as in claim 4 wherein:
   (a) said sorbent introduction step includes feeding said sorbent in a dry, finely divided condition from a first hopper at a metered rate in relation to a predetermined amount of $SO_x$ reduction desired; and
   (b) said urea introduction step includes feeding said urea in a dry crystalline form from a second hopper at a rate within said 1 to 25% by weight range in relation to a predetermined $NO_2$ removal percent desired.

6. An $SO_x/NO_x$ air pollution control process as in claim 4 wherein:
   (a) said sorbent introduction step includes feeding said sorbent in a dry finely divided condition into the flue gas to be treated from a hopper at a metered rate in relation to a predetermined amount of $SO_x$ reduction desired; and
   (b) said urea introduction step includes spraying said urea in a solution form into the flue gas to be treated at a rate within said 1 to 25% by weight range in relation to a predetermined $NO_2$ removal percent desired.

7. An $SO_x/NO_x$ air pollution control process as in claim 4 wherein:

(a) said sorbent introduction step includes feeding said sorbent in a dry finely divided condition into the flue gas to be treated from a hopper at a metered rate in relation to a predetermined amount of $SO_x$ reduction desired; and (b) said ammonia is introduced as a finely divided spray of a solution of anhydrous ammonia in water directly into said flue gases substantially coordinate with the point of injection of said reagent.

8. An $SO_x/NO_x$ air pollution control process as in claim 7 wherein:

(a) said sorbent introduction step includes feeding said sorbent in a dry, finely divided condition from a first hopper at a metered rate in relation to a predetermined amount of $SO_x$ reduction desired; and (b) said urea introduction step includes feeding said urea in a dry crystalline form from a second hopper at a rate within said 1 to 25% by weight range in relation to a predetermined $NO_2$ removal percent desired.

9. An $SO_x/NO_x$ air pollution control process as in claim 7 wherein:

(a) said sorbent introduction step includes feeding said sorbent in a dry finely divided condition into the flue gas to be treated from a hopper at a metered rate in relation to a predetermined amount of $SO_x$ reduction desired; and (b) said urea introduction step includes spraying said urea in a solution form into the flue gas to be treated at a rate within said 1 to 25% by weight range in relation to a predetermined $NO_2$ removal percent desired.

10. An $SO_x/NO_x$ air pollution control process as in claim 4 wherein:

(a) said sorbent introduction step includes feeding said sorbent in a dry finely divided condition into the flue gas to be treated from a hopper at a metered rate in relation to a predetermined amount of $SO_x$ reduction desired; and (b) said ammonia is introduced as a gas directly into said flue gases substantially coordinate with the point of injection of said reagent.

11. An $SO_x/NO_x$ air pollution control process as in claim 10 wherein:

(a) said sorbent introduction step includes feeding said sorbent in a dry, finely divided condition from a first hopper at a metered rate in relation to a predetermined amount of $SO_x$ reduction desired; and (b) said urea introduction step includes feeding said urea in a dry crystalline form from a second hopper at a rate within said 1 to 25% by weight range in relation to a predetermined $NO_2$ removal percent desired.

12. An $SO_x/NO_x$ air pollution control process as in claim 10 wherein:

(a) said sorbent introduction step includes feeding said sorbent in a dry finely divided condition into the flue gas to be treated from a hopper at a metered rate in relation to a predetermined amount of $SO_x$ reduction desired; and (b) said urea introduction step includes spraying said urea in a solution form into the flue gas to be treated at a rate within said 1 to 25% by weight range in relation to a predetermined $NO_2$ removal percent desired.

13. An $SO_x/NO_x$ air pollution control process as in claim 4 wherein:

(a) said sorbent introduction step includes feeding said sorbent in a dry finely divided condition into the flue gas to be treated from a hopper at a metered rate in relation to a predetermined amount of $SO_x$ reduction desired; and (b) said additive injection steps include spraying concentrated aqueous solutions of said additives into said flue gases.

14. An $SO_x/NO_x$ air pollution control process employing a baghouse to simultaneously control particulate emissions comprising the steps of:

(a) introducing a sodium-based dry sorbent into a stream of flue gas from an industrial or utility plant burning fossil fuels or waste to generate electricity, steam or heat, said flue gas containing $SO_2$ and NO ahead of an air preheater wherein said flue gases have a temperature in the range of about 550° F. to about 700° F.;

(b) maintaining said sorbent in contact with said flue gases for a time sufficient to react said sorbent with said $SO_2$ and NO without substantial formation of $NO_2$;

(c) injecting ammonia as an additive downstream of said air preheater to suppress formation of $NO_2$ removal at lower temperatures;

(d) injecting urea as an additive into said flue gases downstream of said air preheater to suppress formation of $NO_2$ by oxidation from NO and to increase the $SO_2$ removal at lower temperatures:

(e) collecting said reacted sorbent and additives in a baghouse; and (f) thereby to remove $SO_x$ and $NO_x$ without formation of a brown plume.

15. An $SO_x/NO_x$ air pollution control process as in claim 14 wherein said sorbent is selected from the group consisting essentially of dry Nahcolite and sodium bicarbonate.

16. An $SO_x/NO_x$ air pollution control process as in claim 15 wherein said urea is used in an amount of from about 5% to 25% of said sorbent, and said ammonia is used in an amount of from about 1 to 5% of said sorbent.

* * * * *